United States Patent [19]

Green et al.

[11] 3,857,939

[45] Dec. 31, 1974

[54] CHEWABLE SODIUM-FREE VITAMIN C TABLETS

[75] Inventors: Jeffrey Alan Green, Parsippany; Louis Magid, Clifton; Paul Edward Sleezer, Denville, all of N.J.

[73] Assignee: Hoffmann-La Roche Inc., Nutley, N.J.

[22] Filed: Nov. 28, 1973

[21] Appl. No.: 419,572

Related U.S. Application Data

[63] Continuation-in-part of Ser. No. 172,883, Aug. 18, 1971, abandoned.

[52] U.S. Cl. .............................. 424/157, 424/280
[51] Int. Cl. ............................................. A61k 15/12
[58] Field of Search ............................ 424/280, 157

[56] References Cited
UNITED STATES PATENTS

| | | | |
|---|---|---|---|
| 1,486,002 | 3/1924 | Alsleben | 424/157 |
| 2,981,656 | 4/1961 | Harrison et al. | 424/157 |
| 3,384,546 | 5/1968 | Palermo | 424/157 |
| 3,452,138 | 6/1969 | Granatek et al. | 424/157 |
| 3,453,368 | 7/1969 | Magid | 424/280 |

OTHER PUBLICATIONS

Goodman et al, Pharm. Basis of Therap. 3rd Edition pp. 993–998.

*Primary Examiner*—Albert T. Meyers
*Assistant Examiner*—Norman A. Drezin
*Attorney, Agent, or Firm*—Samuel L. Welt; Jon S. Saxe; R. Hain Swope

[57] ABSTRACT

Chewable tablets containing ascorbic acid which are acceptable in taste and physical characteristics such as size and free of sodium ions are provided. The tablets of the invention contain ascorbic acid in combination with magnesium hydroxide, magnesium oxide or mixtures thereof.

1 Claim, No Drawings

CHEWABLE SODIUM-FREE VITAMIN C TABLETS

RELATED APPLICATIONS

This application is a continuation-in-part of U.S. Pat. application Ser. No. 172,883 filed Aug. 18, 1971 now abandoned.

BACKGROUND OF THE INVENTION

There has in recent years been a growing concern in medicine over the intake of large amounts of sodium ions inherent in the ingestion of large quantities of certain proprietary pharmaceutical preparations. An example of such preparations is certain commercial antacid preparations which contain sodium chloride or sodium antacid compounds such as, for example, sodium bicarbonate.

It is recognized in medical science that certain conditions warrant the sharp curtailment or elimination of sodium ions from the diet. Such conditions include, for example, cardiac conditions, hypertension, arteriosclerosis, edemas and certain complications of pregnancy. In addition, the level of sodium ions in the body is known to have an effect on the levels of other essential electrolytes such as, for example, the chloride ion.

While few of the above conditions are prevalent among children, there is concern that the ingestion of large amounts of sodium ions may, in long term, have a deleterious effect upon children. Some of this concern is directed to the presently available chewable ascorbic acid tablets wherein much of the ascorbic acid is in the form of sodium ascorbate. Sodium ascorbate has been utilized in such chewable tablets in order to achieve palatability since, prior to the present invention, the art has recognized that free ascorbic acid could not be used alone due to its acidity. As many children as well as adults today take large amounts of ascorbic acid, there have been some expressions of concern by certain members of the medical community, both in the government and in private practice, over the large amounts of sodium ions being ingested with such tablets. Therefore, and in accordance with the present invention, chewable pharmaceutically elegant ascorbic acid tablets are provided which are sodium-free and therefore highly desirable over presently available chewable ascorbic acid tablets.

DETAILED DESCRIPTION OF THE INVENTION

In accordance with the present invention, it has been found that chewable ascorbic acid tablets free of sodium ions yet completely acceptable in taste and essential pharmaceutical properties, particularly tablet size, can be prepared by formulating ascorbic acid with magnesium hydroxide, magnesium oxide or mixtures thereof. Magnesium oxide and magnesium hydroxide have been found to be unexpectedly superior to other conventional antacid substances in the practice of the present invention as they are capable of brining the pH of chewable ascorbic acid tablets containing only unreacted ascorbic acid into the desirable range of from 4.3–5.2 within the time such tablets are in the mouth.

Magnesium hydroxide and oxide, in addition to facilitating the formulation of a chewable ascorbic acid tablet free of sodium ions, are uniquely adaptable to the formation of such tablets by direct compression in that the amounts utilized do not significantly affect the direct compression procedure. Further, magnesium hydroxide and magnesium oxide do not add an undesirable taste which would interfere with the taste formulation of the tablets and have an acceptable "feel" in the mouth. These substances do not, in the quantities contemplated herein, add sufficient weight or bulk to the tablets as to present either a compounding problem or a problem with the size of the finished tablet. In addition, as the quantities of magnesium hydroxide and magnesium oxide contemplated in the present invention are well below their normal antacid dosages, the tablets of the invention are, in normal usage, free from disadvantages, such as "acid rebond," inherent in the administration of large amounts of antacid substances.

The chewable tablets of the present invention are considered to be unique in that they contain a substance of fairly strong alkalinity in unreacted form and that 100% of the ascorbic acid present is in the unreacted form. Neither of these characteristics is to be found in any commercially available chewable ascorbic acid tablet. The formation of such tablets is predicated on the discovery that magnesium hydroxide and/or magnesium oxide can be combined with ascorbic acid into a stable tablet of acceptable size which possesses excellent mouth "feel" and taste. It is considered to be unexpected that magnesium hydroxide and/or magnesium oxide are capable of masking the acidic taste of ascorbic acid for the time, usually about a minute, that a chewable tablet is retained in the mouth. This unexpectedness is based on the fact that the art is unaware of the possibility that a chewable tablet containing only ascorbic acid and an unreacted alkaline substance would possess an acceptable taste and mouth feel.

The chewable tablets of the present invention are considered to be unexpected in that other conventional antacid substances generally recognized in the art as "equivalent" to or interchangeable with magnesium hydroxide and magnesium oxide in conventional preparations such as, for example, antacid tablets, are totally unacceptable in the tablets of the present invention. Probably the most common of these "equivalent" substances is aluminum hydroxide. The total unacceptability of aluminum hydroxide in the chewable ascorbic acid tablets of the present invention is appreciated when it is considered that tablets formulated with an amount of aluminum hydroxide equal to five times the maximum amount of magnesium hydroxide and/or oxide contemplated in the chewable tablets of the present invention on a per weight basis fails to produce an ascorbic acid tablet having an acceptable taste. It is readily apparent that the quantity of aluminum hydroxide necessary to achieve the degree of rapid neutralization required in the chewable tablets contemplated in the present invention would dictate the compounding of tablets so oversized as to preclude ingestion except where very small quantities of ascorbic acid are present, i.e., 25 mg. and below. As ascorbic acid tablets should contain at least 50 mg. and preferably 100 mg. or more of active substance to be commercially attractive, it is readily apparent that aluminum hydroxide is not acceptable for use in the tablets of the present invention, particularly in the preferred embodiment thereof wherein high potency chewable tablets, i.e., containing at least 250 mg. of ascorbic acid, are contemplated.

The sodium-free chewable ascorbic acid tablets of the present invention can be prepared by any method conventional in the art of pharmaceutical compounding. It is preferred, however, to prepare the tablets of the invention by direct compression thus minimizing the possibility of an acid-base reaction. Therefore, the preferred conventional binders, excipients, flavors, lubricants and the like utilized in the formulation of the tablets of the invention are those which, in addition to being free of sodium ions, possess physical characteristics suitable for the technique of direct compression. In addition to adaptability to the technique of direct compression, the preferred binders, excipients, disintegrants, flavoring agents and the like, according to the present invention, are those conventional agents whose physical characteristics make them acceptable for the formulation of chewable tablets.

Among the many conventional agents recognized in the art of pharmaceutical compounding as being suitable for direct compression there can be named, for example, pregelatinized starch, direct compression grade lactose, crystalline tabletting sorbitol, talc, commercial compressible sugar-dextrin products such as NuTab produced by Mallinckrodt Chemical Works, Inc., St. Louis, Mo. or Sugartab produced by Edward Mendell Corp., Inc. Yonkers, N.Y., micro-crystalline cellulose; suitable certified flavoring and coloring agents; preservatives; lubricating agents such as, for example, magnesium or calcium stearate, colloidal silica or the like.

It is also within the purview of the present invention to include the composition comprising ascorbic acid and magnesium hydroxide, magnesium oxide or mixtures thereof as a source of vitamin C activity in a chewable multiple vitamin tablet prepared by direct compression. In addition to the ascorbic acid compositions of the present invention, such chewable multiple vitamin tablets contain conventional vitamins such as, for example, vitamin $B_1$, vitamin $B_{12}$, vitamin A, vitamin D, vitamin E and the like in forms which are art-recognized as being adaptable to the formulation of chewable tablets by direct compression. It is to be understood, however, that such other vitamin substances utilized to form chewable multivitamin tablets in accordance with the present invention are in a form free of sodium ions.

Ascorbic acid as utilized in the practice of the invention may be in either crystalline or powder form. Such forms of ascorbic acid cannot be directly compressed without the addition of suitable adjuvants and excipients which may comprise a major portion, for example 50% to 80% of the weight of these tablets. It is therefore preferred in the practice of the invention to utilize ascorbic acid in the form of a high-potency granulation containing from about 85% to about 95% by weight ascorbic acid. The preparation of such granulations is described in Magid U.S. Pat. No. 3,453,368, the teachings of which are hereby incorporated herein by reference.

In accordance with the present invention, either magnesium oxide or magnesium hydroxide may be utilized alone or in any proportion with each other. If a combination of the two is utilized, the proportions of each are in no way critical to the invention. It is also within the purview of the invention to utilize all the various pharmaceutical grades of these substances such as, for example, light and heavy magnesium oxide. Preferred among the various grades of these substances known in the art is light magnesium oxide.

In general, the tablets of the present invention contain from about 10% to about 60% by weight ascorbic acid and from about 2.5% to about 30% by weight magnesium oxide or magnesium hydroxide or mixtures thereof based on the weight of the ascorbic acid present. Preferably, the tablets of the invention contain from about 30% to about 45% by weight ascorbic acid and from about 10% to about 20% magnesium oxide or magnesium hydroxide or mixtures thereof based on the weight of the ascorbic acid present. The tablets of the invention may be formulated to contain amounts of ascorbic acid conventional in the art, i.e., 50 mg., 100 mg., 250 mg., 300 mg., 500 mg. and the like with tablets containing at least 250 mg. ascorbic acid being preferred. Tablets so formulated have been found to be acceptable in terms of taste and feel in the mouth and also to fully meet art-recognized pharmaceutical standards of size, hardness, color, disintegration and the like.

The following examples are given as further illustrations of the invention.

EXAMPLE 1 a. In this example, 30.0 parts by weight of magnesium oxide (light) were combined with 300.0 parts by weight of crystalline tablet-type sorbitol, 1.0 parts by weight insoluble saccharin and 6 parts by weight magnesium stearate and thoroughly blended. A small amount of the mixture was removed and triturated with a total of 12.43 parts by weight certified colors and flavors. The color and flavor containing portion was then thoroughly blended with the remainder of the mixture and the whole passed through a Fitzpatrick Comminuting Machine, operating at slow speed, equipped with a 2A-screen, knives forward. A total of 292.0 parts by weight of a granulation containing 90% by weight of ascorbic acid, representing 250 mg. ascorbic acid with a 5% manufacturing excess, was blended with 300.0 parts by weight NuTab (medium) and the mixture passed through a Fitzpatrick Comminuting Machine equipped with a No. 12 mesh screen, operating a slow speed, knives forward. The two mixtures were then thoroughly blended in a suitable mixer and compressed into tablets utilizing conventional tablet pressing equipment. Each such tablet weighed approximately 940 mg.

b. The procedure described in Section (a) of this example was repeated using 40.0 parts by weight magnesium hydroxide and 290.0 parts by weight NuTab.

c. The procedure described in Section (a) of this example was repeated using 15.0 parts by weight of magnesium oxide, 20.0 parts by weight magnesium hydroxide and 295.0 parts by weight NuTab.

EXAMPLE 2

For comparative purposes, chewable ascorbic acid tablets were prepared by the procedure described in Example 1 from the following formulations:

| Ingredient Mg./Tablet | Formulation A | B | C |
|---|---|---|---|
| Magnesium Hydroxide | — | — | 40.0 |
| Aluminum Hydroxide | — | 40.0 | — |
| Ascorbic Acid, 90% Granulation | 292.0 | 292.0 | 292.0 |
| Sorbitol | 300.0 | 300.0 | 300.0 |
| NuTab (Medium)* | 300.0 | 300.0 | 300.0 |
| Artificial Orange Flavor | 9.0 | 9.0 | 9.0 |
| Magnesium Stearate | 6.0 | 6.0 | 6.0 |
| Total Weight | 907.0 | 947.0 | 947.0 |

*Directly compressible sugar-dextrin, Mallinckrodt Chemical Works, Inc., St. Louis, Mo.

Samples of these tablets were placed in water and pH readings were taken immediately and after 3 minutes. Three minutes was chosen as it represents the maximum amount of time a chewable tablet is usually retained in the mouth. The pH readings given in Table I below clearly establish the inability of aluminum hydroxide to appreciably neutralize the ascorbic acid in the allotted time. To demonstrate that this difference in ability to affect the pH of the tablet in the mouth directly determines whether the taste of the tablet is acceptable, tablets prepared from the above formulations were chewed by an impartial ten member taste panel. The results of this test are reported in Table II.

| Panelist No. | Tablet from Formulation | | |
|---|---|---|---|
| | A | B | C |
| 1 | Very acid | Too acid | Fairly bland |
| 2 | Very acid | Much too acid | Bland |
| 3 | Very acid | Too acid | Bland |
| 4 | Very acid | Much too acid | Very bland |
| 5 | Very acid | Much too acid | Bland |
| 6 | Very acid | Too acid | Bland |
| 7 | Very acid | Too acid | Bland |
| 8 | Very acid | Acid | Bland |
| 9 | Very acid | Acid | Bland |
| 10 | Very acid | Too acid | Bland |

The results of this study demonstrate that the pH data in Table I is a clear indication of whether tablets prepared from the above formulations are acceptable in taste. The results of these studies show that aluminum hydroxide is unacceptable for the formulation of a chewable ascorbic acid tablet wherein 100% of the ascorbic acid is present in an unreacted form i.e. as the free acid.

EXAMPLE 3

To compare the relative efficacy of aluminum hydroxide and magnesium oxide in masking the acidic taste of ascorbic acid in a chewable tablet, tablets were prepared from the following formulations by the procedure of Example 1.

| Formulation | pH Reading | |
|---|---|---|
| | Immediately | At 3 Minutes |
| A | 3.40 | 3.50 |
| B | 3.45 | 3.55 |
| C | 4.25 | 4.45 |
| D | 3.45 | 3.40 |
| E | 3.40 | 3.50 |
| F | 7.00 | 8.90 |

To demonstrate the effect of the above pH determinations, tablets prepared from formulations A through D above were tasted by an impartial five-member panel. As the tablets tested were prepared without any flavoring agent, the panel was asked to rate the acidity of the tablets on a scale of 5 giving 1 the least acid tasting tablet, 3 for the most acid tasting tablet which had an acceptable taste and from 3.5 to 5 for unacceptable taste due to excess acidity. Formulation E was not tested as the pH determinations thereof were essentially the same as formulations A and B. Formulation F was not tested as the pH determinations showed it to be neutral and therefore of no consequence in a consideration of relative acidity. The results of this test are set forth in Table II below.

| Subject No. | Acidity Rating-Formulation | | | |
|---|---|---|---|---|
| | A | B | C | D |
| 1 | 5 | 4 | 1 | 5 |
| 2 | 5 | 5 | 2 | 5 |
| 3 | 3.5 | 3.5 | 2 | 4 |
| 4 | 5 | 4 | 2 | 5 |
| 5 | 4.5 | 4 | 2 | 5 |

The results of this study clearly demonstrate that of the tablets in the test, only those containing magnesium oxide had an acceptable taste.

We claim:

1. A chewable vitamin C tablet having improved palatability characteristics consisting essentially of from about 50mg. to about 500 mg ascorbic acid, a sub-

| Ingredient | Formulation | | | | | |
|---|---|---|---|---|---|---|
| (Mg./Tablet) | A | B | C | D | E | F |
| Magnesium Oxide (light) | — | — | 30.05 | — | — | 60.00 |
| Aluminum Hydroxide | 58.13 | 174.39 | — | — | 348.78 | — |
| Ascorbic Acid, 90% Granulation | 292.00 | 292.00 | 292.00 | 292.00 | 292.00 | 292.00 |
| Sorbitol | 300.00 | 300.00 | 300.00 | 300.00 | 300.00 | 300.00 |
| NuTab (medium) | 300.00 | 300.00 | 300.00 | 300.00 | 300.00 | 300.00 |
| Insoluble Saccharin | 1.00 | 1.00 | 1.00 | 1.00 | 1.00 | 1.00 |
| Magnesium Stearate | 4.50 | 4.50 | 4.50 | 4.50 | 4.50 | 4.50 |
| Total Weight | 955.63 | 1071.89 | 927.55 | 897.50 | 1246.28 | 957.50 |
| Tabletting Characteristics* | Poor | Very poor | Satisfactory | Satisfactory | Very poor | Satisfactory |

*Suitability of the formulation to the preparation of tablets by direct compression.

Samples of these tablets were placed in water and pH readings were taken immediately and after 3 minutes. The results of this test, given in Table I below, clearly establish the inability of aluminum hydroxide to appreciably neutralize the ascorbic acid in the alloted time even when present in a concentration six times that which theoretically would be required to do so (formulation E).

stance selected from the group consisting of magnesium hydroxide, magnesium oxide and mixtures thereof, said substance being present in from about 10 per cent to about 20 per cent by weight of ascorbic acid present and therapeutically inert, pharmaceutically acceptable excipients, said excipients being characterized by being free of sodium ions.

* * * * *